United States Patent
Fukui et al.

(10) Patent No.: US 7,622,539 B2
(45) Date of Patent: Nov. 24, 2009

(54) ORGANOPOLYSILOXANE AND SILICONE COMPOSITION

(75) Inventors: Hiroshi Fukui, Chiba (JP); Satoshi Onodera, Chiba (JP); Tadashi Okawa, Chiba (JP)

(73) Assignee: Dow Corning Toray Company, Ltd., Tokyo (JP)

(*) Notice: Subject to any disclaimer, the term of this patent is extended or adjusted under 35 U.S.C. 154(b) by 342 days.

(21) Appl. No.: 11/721,788

(22) PCT Filed: Dec. 12, 2005

(86) PCT No.: PCT/JP2005/023195

§ 371 (c)(1),
(2), (4) Date: Jun. 14, 2007

(87) PCT Pub. No.: WO2006/064928

PCT Pub. Date: Jun. 22, 2006

(65) Prior Publication Data

US 2008/0085966 A1    Apr. 10, 2008

(30) Foreign Application Priority Data

Dec. 16, 2004 (JP) ............... 2004-365159

(51) Int. Cl.
*C08G 77/20* (2006.01)

(52) U.S. Cl. ............... 528/32; 528/14; 524/588; 524/437

(58) Field of Classification Search ............... 528/14, 528/32; 524/588, 437
See application file for complete search history.

(56) References Cited

U.S. PATENT DOCUMENTS 3,759,867 A    9/1973    Merrill et al.

(Continued)

FOREIGN PATENT DOCUMENTS

EP    0564253 A1    10/1993

(Continued)

OTHER PUBLICATIONS

English language translation and abstract for JP08-073592 extracted from Searching PAJ database dated Oct. 25, 2007, 21 pages.

(Continued)

*Primary Examiner*—David Wu
*Assistant Examiner*—Satya B Sastri
(74) *Attorney, Agent, or Firm*—Howard & Howard Attorneys PLLC

(57) ABSTRACT

An organopolysiloxane represented by the following general formula (1), where $R^1$ represents an aliphatic, unsaturated univalent hydrocarbon group, $R^2$ represents identical or different univalent hydrocarbon groups except for aliphatic unsaturated bonds, $R^3$ represents an oxygen atom or a bivalent hydrocarbon group, $R^4$ represents a univalent hydrocarbon group that contains an acryloxy or methacryloxy group, $R^5$ may represent an alkyl group, alkoxyalkyl group, alkenyl group, or an acyl group; "n" is an integer from 5 to 1000, and "a" is 1 or 2, can be used for the preparation of a silicone composition as a main component of a composition or as a surface-treating agent for thermally conductive fillers, can be combined with large amounts of thermally conductive fillers, is easy to handle, and imparts to the composition appropriate thixotropy.

(1)

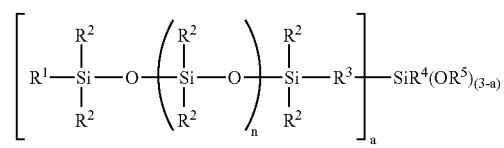

19 Claims, 1 Drawing Sheet

U.S. PATENT DOCUMENTS

| | | | | |
|---|---|---|---|---|
| 5,300,608 | A | * | 4/1994 | Chu et al. ............... 528/14 |
| 5,645,941 | A | | 7/1997 | Meguriya et al. |
| 6,306,957 | B1 | | 10/2001 | Nakano et al. |
| 6,380,301 | B1 | | 4/2002 | Enami et al. |
| 6,403,749 | B1 | * | 6/2002 | Miyake et al. ............ 528/20 |
| 6,844,393 | B2 | | 1/2005 | Goto et al. |
| 7,329,706 | B2 | * | 2/2008 | Fukui et al. ............ 524/588 |
| 2002/0028335 | A1 | | 3/2002 | Fujiki et al. |

FOREIGN PATENT DOCUMENTS

| | | | |
|---|---|---|---|
| EP | 564253 A1 | * | 10/1993 |
| EP | 0625548 A2 | | 11/1994 |
| EP | 1403326 A1 | * | 3/2004 |
| JP | 58162660 | | 9/1983 |
| JP | 4293962 | | 10/1992 |
| JP | 2279616 A | | 1/1995 |
| JP | 8073592 | | 3/1996 |
| JP | 9012724 | | 1/1997 |
| JP | 2000-256558 | | 9/2000 |
| JP | 2001-139815 | | 5/2001 |
| JP | 2003-213133 | | 7/2003 |
| WO | WO 02/097393 A3 | | 12/2002 |

OTHER PUBLICATIONS

English language translations and abstract for JP 09-12724 extracted from Searching PAJ database dated Oct. 25, 2007, pp. 35.

English language abstract for JP 4293962 extracted from espacenet. com database dated Feb. 22, 2007.

English language abstract for JP 58162660 extracted from espacenet. com database dated Feb. 22, 2007.

English language abstract for JP 2000-256558 extracted from espacenet.com database dated Oct. 25, 2007.

English language abstract for JP 2001-139815 extracted from espacenet.com database dated Oct. 25, 2007.

English language abstract for JP 2003-213133 extracted from espacenet.com database dated Oct. 25, 2007.

PCT International Search Report for PCT/JP2005/011864, Jan. 20, 2006, 5 pages.

PCT International Search Report for PCT/JP2005/011576, Jan. 04, 2006, 4 pages.

PCT International Search Report for PCT/JP2005/018405, Mar. 22, 2006, 6 pages.

Yongxin Han et al. "Silicon Directed *ipso*-Substitution of Polymer Bound Arylsilanes: Preparation of Biaryls via", Tetrahedron Letters, vol. 37, No. 16. 1996, pp. 2703-2706.

Schultz et al., "The Synthesis Of Trimethylsilylmethoxymethyl Chloride", OPPI Briefs, vol. 27, No. 5, 1995, pp. 572-574.

Hojo et al., "New Access To Carbonyl Ylides By The Silicon-Based 1,3-Elimination and Their: . . .", Tetrahedron Letters, vol. 34, No. 37, 1993, pp. 5943-5946.

Boons et al., "Use of (Phenyldimethylsilyl)methoxymethyl and (Phenyldimethylsilyl)methyl ethers . . .", Tetrahedron Letters, vol., 31, No. 15, 1990, pp. 2197-2200.

Hasseberg et al., "104. Synthese von Orellin", Helvetica Chimica Acta—vol. 71, No. 5, 1988, pp. 957-963.

Guedin-Vuong et al., "An Easy Access To Homopropargylic Ethers", Bulletin De La Societe Chimique De France, No. 2, 1986, pp. 245-252.

Pyne et al., "Chiral and Stereochemical Control via Intramolecular Diels—Alder Reaction of Z Dienes", J. American Chemical Society, vol. 104, No. 21, 1982, pp. 5719-5728.

Lipshutz et al., "B-(Trimethylylsilyl) Ethoxymethyl Chloride . . . ," Tetrahedron Letters, vol. 21, No. 35, 1980, pp. 3343-3346.

Shikhiev et al., "Synthesis and Reactions of Unsaturated Organosilicon Compounds", J. Of General Chemistry of the USSR, vol. 41, No. 3, 1971, pp. 617-619.

Shipov et al., "Synthesis of Alkyl Chloromethyl Ethers", J. Of General Chemistry of the USSR, vol. 59, No. 5.2, 1989, p. 1067.

Miramon et al., "Short Synthesis of Polyoxygenated Macrocyclic . . .", Journal of Organic Chemistry, vol. 69, No. 20, 2004, pp. 6949-6952.

Shikhiev et al., "Synthesis and Reactions of Some Heteroorganic Ethers . . .", J. Of General Chemistry of the USSR, vol. 45, No. 1, 1975, pp. 91-93.

English language abstract for JP2000277551 extracted from espacenet.com May 28, 2008.

* cited by examiner

Fig. 1

ORGANOPOLYSILOXANE AND SILICONE COMPOSITION

RELATED APPLICATIONS

This application claims priority to and all the advantages of International Patent Application No. PCT/JP2005/023195, filed on Dec. 12, 2005, which claims priority to Japanese Patent Application No. JP2004-365159, filed on Dec. 16, 2004.

TECHNICAL FIELD

The present invention relates to an organopolysiloxane and a silicone composition. More specifically, the invention relates to a novel organopolysiloxane that has on its molecular terminals aliphatic, unsaturated univalent groups and contains an acryloxy or methacryloxy group and silicon-bonded hydrolyzable groups. The invention also relates to a silicone composition that contains the aforementioned organopolysiloxane as a main component or as a surface-treating agent for thermally conductive filler. The composition is easy to handle and possesses appropriate thixotropy, even when the aforementioned filler is used in a large amount.

BACKGROUND ART

An organopolysiloxane that contains acrylic or methacrylic groups can be combined with an improver of an acryl- or methacryl-type resin in the form of a silicone macromonomer or it can be used as one of the main components of a silicone composition by adding a photosensitizer to form a composition cross-linkable by irradiating with high-energy beams such as UV radiation beams. In Japanese Unexamined Patent Application Publication (hereinafter referred to as "Kokai") H8-73592, an organopolysiloxane that contains an acrylic or methacrylic group on one terminal is disclosed as an organopolysiloxane having acryl- or methacryl-polymerizable groups and obtained by reacting a dimethylmonohalosilane having an acrylic or methacrylic group with a polymer obtained by anion-living polymerization of a hexamethylcyclotrisiloxane by using a low-molecular-weight compound with a siloxylithium on one terminal as a reaction initiator, in the presence of an amine compound. Furthermore, Kokai H9-12724 discloses a diorganopolysiloxane that contains an acrylamide or methacrylamide group on one terminal and is obtained by causing a reaction between a halideacrylate or halidemethacrylate and a diorganopolysiloxane that contains an amino group on one terminal in an alkaline aqueous solution. However, an organopolysiloxane that contains aliphatic, unsaturated, univalent hydrocarbon groups on molecular terminal and that also contains an acrylic or methacrylic group and a silicon-bonded hydrolyzable group has not been known.

On the other hand, as disclosed in Kokai 2000-256558 and 2001-139815, in order to obtain a thermally conductive silicone composition with a large amount of thermally conductive filler, it is proposed to use as a surface-treating agent for the thermally conductive filler an organopolysiloxane with silicon-bonded hydrolyzable groups. However, when such an organopolysiloxane is used with large amounts of such thermally conductive fillers as alumina, the viscosity of the obtained silicone composition rapidly increases and makes the composition difficult for handling and forming.

Furthermore, Kokai 2003-213133 discloses the use of a surface-treating agent for thermally conductive filler in the form of an organopolysiloxane that contains vinyl groups and silicon-bonded hydrolyzable groups. Such an organopolysiloxane can be used in conjunction with large amounts of thermally conductive fillers such as alumina, but the problem is that the obtained silicone composition either does not possess thixotropy and easily precipitates during long storage, or becomes flowable during use.

It is an object of the present invention to provide a novel organopolysiloxane that contains on its terminals aliphatic, unsaturated, univalent hydrocarbon groups, an acrylic or methacrylic group, and silicon-bonded hydrolyzable groups. It is another object to provide a silicone composition that contains the aforementioned organopolysiloxane as a main component or as a surface-treating agent for a thermally conductive filler for obtaining a silicone composition of high thermal conductivity that is easy to handle and possesses appropriate thixotropy, even when the aforementioned thermally conductive filler is used in a large amount.

DISCLOSURE OF INVENTION

The organopolysiloxane of the present invention is represented by the following general formula:

where $R^1$ represents an aliphatic, unsaturated univalent hydrocarbon group, $R^2$ represents identical or different univalent hydrocarbon groups that do not have aliphatic unsaturated bonds, $R^3$ represents an oxygen atom or a bivalent hydrocarbon group, $R^4$ represents a univalent hydrocarbon group that contains an acryloxy or methacryloxy group, $R^5$ may represent an alkyl group, alkoxyalkyl group, alkenyl group, or an acyl group; "n" is an integer from 5 to 1000, and "a" is 1 or 2.

The silicone composition of the invention comprises:
(A) an organopolysiloxane with the exception of component (C) given below,
(B) a thermally conductive filler, and
(C) an organopolysiloxane represented by the following general formula:

where $R^1$ represents an aliphatic, unsaturated univalent hydrocarbon group, $R^2$ represents identical or different univalent hydrocarbon groups that do not have aliphatic unsaturated bonds, $R^3$ represents an oxygen atom or a bivalent hydrocarbon group, $R^4$ represents a univalent hydrocarbon group that contains an acryloxy or methacryloxy group, $R^5$ may represent an alkyl group, alkoxyalkyl group, alkenyl group, or an acyl group; "n" is an integer from 5 to 1000, and "a" is 1 or 2, or said component (B) and said component (C).

Effects of Invention

Since the organopolysiloxane of the present invention constitutes a novel compound that contains on its terminals aliphatic, unsaturated, univalent hydrocarbon groups, an acryloxy or methacryloxy group, and silicon-bonded hydrolyzable groups, and since the silicone composition of the invention contains the aforementioned organopolysiloxane as a main component or as a surface-treating agent for a thermally conductive filler, it becomes possible to use the aforementioned thermally conductive silicone composition in combination with a large amount of a thermally conductive filler. Furthermore, the composition is easy to handle and possesses thixotropic properties.

REFERENCE NUMBERS

1 ground glass
2 silicone composition or silicone cross-linked product
3 exuded oil component
X width of the zone of exudation of oil component in the longitudinal direction
Y width of the zone of exudation of oil component in the transverse direction
R width of the silicone composition layer or silicone cross-linked product

DETAILED DESCRIPTION OF THE INVENTION

Let us first consider in more detail the organopolysiloxane of the present invention. The organopolysiloxane of the present invention is represented by the following general formula:

In this formula, $R^1$ may designate an aliphatic, unsaturated, univalent hydrocarbon group. The following are specific examples of such a group: vinyl, allyl, butenyl, hexenyl, decenyl, undecenyl, dodecenyl, tridecenyl, tetradecenyl, pentadecenyl, hexadecenyl, heptadecenyl, octadecenyl, nonadecenyl, eicocenyl, or similar linear-chained alkenyl groups; isopropenyl, 2-methyl-2-propenyl, 2-methyl-10-undecenyl, or similar branch-chained alkenyl groups; vinylcyclohexyl, vinylcyclodecyl, or similar cyclic alkyl groups that contain aliphatic unsaturated groups; vinylphenyl group, or a similar aryl groups that contain aliphatic, unsaturated groups; vinylbenzyl, vinylphenethyl groups or similar aralkyl groups that contain aliphatic unsaturated groups. Of these, most preferable are linear-chained alkenyl groups, especially vinyl, allyl, and hexenyl groups. There are no special restrictions with regard to the position of aliphatic unsaturated bonds in $R^1$ of the above formula, but it is preferable to locate the unsaturated bond of $R^1$ farther from silicon atoms. $R^2$ may represent identical or different univalent hydrocarbon groups that do not have aliphatic, unsaturated bonds. The following are specific examples of such groups: methyl, ethyl, propyl, butyl, or similar linear-chained alkyl groups; isopropyl, tert-butyl, tert-pentyl, or similar branch-chained alkyl groups; cyclopentyl, cyclohexyl, or similar cyclic alkyl groups; phenyl, tolyl, xylyl, or similar aryl groups; benzyl, phenethyl, or similar aralkyl groups; 3-chloropropyl, 3,3,3-trifluoropropyl, or similar halogenated alkyl groups. Of these, the most preferable are alkyl and aryl groups, especially alkyl groups with 1 to 4 carbon atoms, and especially preferable are methyl and ethyl groups. In the above formula, $R^3$ designates an oxygen atom or a bivalent hydrocarbon group. The bivalent hydrocarbon group of $R^3$ can be exemplified by ethylene, propylene, butylene, methylethylene, or similar alkylene groups; phenylene or similar arylene groups. Of these, most preferable are ethylene and propylene groups. In the above formula, $R^4$ designates an acryloxy- or methacryloxy-containing univalent hydrocarbon group that can be exemplified by an acryloxy- or methacryloxy-containing univalent hydrocarbon group of the following general formula:

In the above formula, $R^6$ may represent a hydrogen atom, a phenyl group, or a halogenated phenyl group. An example of a halogenated phenyl group used as $R^6$ is a chlorophenyl group. Most preferable for $R^6$ is a hydrogen atom. $R^7$ may represent a hydrogen atom or a methyl group. In the above formula, $R^8$ represents a bivalent hydrocarbon group. Specific examples of such a group are the following: ethylene, propylene, butylene, methylethylene, or similar alkylene groups; phenylene or similar arylene groups. Of these, most preferable are ethylene and propylene groups. Furthermore, in the above formula, $R^5$ may represent an alkyl, alkoxyalkyl, alkenyl, or an acyl group. The aforementioned alkyl group that is designated by $R^5$ can be exemplified by methyl, ethyl, propyl, butyl, or a similar linear-chained alkyl group; isopropyl, tert-butyl, tert-pentyl, or a similar branch-chained alkyl group; cyclopentyl, cyclohexyl, or a similar cyclic alkyl group. The aforementioned alkoxyalkyl group that is designated by $R^5$ can be represented by a methoxyethyl or methoxypropyl group. The aforementioned alkenyl group that is designated by $R^5$ can be represented by vinyl, allyl, butenyl, hexenyl, decenyl, undecenyl, dodecenyl, tridecenyl, tetradecenyl, pentadecenyl, hexadecenyl, heptadecenyl, octadecenyl, nonadecenyl, eicocenyl, or a similar linear-chained alkenyl group; isopropenyl, 2-methyl-2-propenyl, 2 methyl-10-undecenyl, or a similar branch-chained alkenyl group. The aforementioned acyl group that is designated by $R^5$ can be represented by an acetyl or octanoyl group. Most preferable groups designated by $R^5$ are alkyl groups, especially a methyl or ethyl group. In the above formula, "n" is an integer within the range of 5 to 1000, and "a" is 1 or 2.

A method suitable for the preparation of the above-mentioned organopolysiloxane may consist of, e.g., reacting an organopolysiloxane which is capped on one molecular terminal with a silanol group and is represented by the following general formula:

where $R^1$ designates an aliphatic, unsaturated, univalent hydrocarbon group, $R^2$ designates identical or different univalent hydrocarbon groups that do not have aliphatic, unsaturated bonds, and "n" is an integer within the range of 5 to 1000, with a silane compound of the following general formula:

where $R^4$ is a univalent hydrocarbon group that contains an acryloxy or methacryloxy group, and $R^5$ is an alkyl, alkoxyalkyl, alkenyl, or an acyl group, in the presence of an acetic acid or a similar acidic catalyst or calcium hydroxide or a similar alkali catalyst.

The following are examples of formulas that may express the organopolysiloxane of the present invention:

dimethylpolysiloxane of the following formula:

dimethylpolysiloxane of the following formula:

dimethylpolysiloxane of the following formula:

dimethylpolysiloxane of the following formula:

dimethylpolysiloxane of the following formula:

dimethylpolysiloxane of the following formula:

dimethylpolysiloxane of the following formula:

dimethylpolysiloxane of the following formula:

dimethylpolysiloxane of the following formula:

dimethylpolysiloxane of the following formula:

dimethylpolysiloxane of the following formula:

dimethylpolysiloxane of the following formula:

dimethylpolysiloxane of the following formula:

dimethylpolysiloxane of the following formula:

dimethylpolysiloxane of the following formula:

dimethylpolysiloxane of the following formula:

The above-described organopolysiloxane of the present invention can be used as a surface-treating agent for an inorganic powder, especially for a thermally conductive powder. Inorganic powders suitable for treating with the organopolysiloxane of the invention may be aluminum powder, copper powder, nickel powder, or another metal powder; an alumina powder, magnesium oxide powder, beryllium oxide powder, chromium oxide powder, titanium oxide powder, or a similar metal oxide powder; boron nitride powder, aluminium nitride powder, or a similar metal nitride powder; boron carbide powder, titanium carbide powder, silicon carbide powder, or a similar metal carbide powder; a metal oxide-type powder for imparting conductivity to surfaces by coating said surfaces with a metal-containing substance; as well as fumed silica, hydrophobized fumed silica, precipitated silica, fused silica, diatomaceous earth, talc, calcium carbonate, zinc oxide, titanium dioxide, iron oxide, manganese carbonate, and cerium hydroxide. There are no special restrictions with regard to the methods of treating the surfaces of the aforementioned inorganic powders, and any suitable methods known in the art can be used.

The following is a more detailed description of a silicone composition of the present invention. The silicone composition of the present invention comprises:

(A) an organopolysiloxane with the exception of component (C) given below,
(B) a thermally conductive filler, and
(C) an organopolysiloxane represented by the following general formula:

where $R^1$ represents an aliphatic, unsaturated univalent hydrocarbon group, $R^2$ represents identical or different univalent hydrocarbon groups that do not have aliphatic unsaturated bonds, $R^3$ represents an oxygen atom or a bivalent hydrocarbon group, $R^4$ represents a univalent hydrocarbon group that contains an acryloxy or methacryloxy group, $R^5$ may represent an alkyl group, alkoxyalkyl group, alkenyl group, or an acyl group; "n" is an integer from 5 to 1000, and "a" is 1 or 2.

Such a composition may be a non-cross-linked grease-like substance or may be turned into a viscous or a solid substance by adding (D) a cross-linking agent to make it cross-linkable and subjecting it to cross-linking. There are no special restrictions with regard to a cross-linking operation, and this may be, e.g., hydrosilylation-type cross-linking, condensation-type cross-linking, or a free-radical reaction with the use of an organic peroxide.

Component (A) is a main component of the composition. There are no special restrictions with regard to this component, if it is an organopolysiloxane other than aforementioned component (C). The following are examples of groups bonded to silicon atoms of component (A): methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicocyl, or a similar linear-chained alkyl group; isopropyl, tert-butyl, isobutyl, 2-methylundecyl, 1-hexylheptyl, or a similar branch-chained alkyl group; cyclopentyl, cyclohexyl, cyclododecyl, or a similar cyclic alkyl group; vinyl, allyl, butenyl, pentenyl, hexenyl, or a similar alkenyl group; phenyl, tolyl, xylyl, or a similar aryl group; benzyl, phenethyl, 2-(2,4,6-trimethylphenyl) propyl, or a similar aralkyl group; 3,3,3-trifluoropropyl, 3-chloropropyl, or a similar halogenated alkyl group. Of these, most preferable are alkyl, alkenyl, and aryl groups, especially methyl, vinyl, and phenyl group. There are no special restrictions with regard to the viscosity of component (A) at 25° C., but it recommended to have the viscosity within the range of 20 to 100,000 mPa·s, preferably within the range of 50 to 100,000 mPa·s, further preferably 50 to 50,000 mPa·s, and even more preferably within the range of 100 to 50,000 mPa·s. If the viscosity is below the lower limit of the recommended range, it will significantly impair the physical properties of the obtained composition. If, on the other hand, the viscosity exceeds the upper limit of the recommended range, the composition will become difficult to handle. There are no special restrictions with regard to the molecular structure of the aforementioned component (A) that may have a linear, branched, partially branched linear, or a dendrimer-type molecular structure of which the linear and partially branched linear molecular structures are preferable. For example, this may be a polymer having the aforementioned molecular structures, copolymer having the aforementioned molecular structures, or mixture of the above polymer and/or copolymer.

The following are specific examples of component (A): dimethylpolysiloxane capped at both molecular terminals with dimethylvinylsiloxy groups; methylphenylpolysiloxane capped at both molecular terminals with dimethylvinylsiloxy groups; copolymer of methylphenylsiloxane and dimethylsiloxane capped at both molecular terminals with dimethylvinylsiloxy groups; copolymer of methylvinylsiloxane and dimethylsiloxane capped at both molecular terminals with dimethylvinylsiloxy groups; copolymer of methylvinylsiloxane and dimethylsiloxane capped at both molecular terminals with trimethylsiloxy groups; methyl (3,3,3-trifluoropropyl) polysiloxane capped at both molecular terminals with dimethylvinylsiloxy groups; copolymer of methylvinylsiloxane and dimethylsiloxane capped at both molecular terminals with silanol groups; copolymer of methylphenylsiloxane, methylvinylsiloxane, and dimethylsiloxane capped at both molecular terminals with silanol groups; copolymer of organosiloxanes composed of the siloxane units represented by the following formulas: $(CH_3)_3SiO_{1/2}$, $(CH_3)_2(CH_2=CH)SiO_{1/2}$, $CH_3SiO_{3/2}$, and $(CH_3)_2SiO_{2/2}$; dimethylpolysiloxane having both molecular terminals capped with silanol groups; copolymer of methylphenylsiloxane and dimethylsiloxane capped at both molecular terminals with silanol groups; dimethylpolysiloxane having both molecular terminals capped with trimethoxysiloxy groups; copolymer of methylphenylsiloxane and dimethylsiloxane capped at both molecular terminals with trimethoxysilyl groups; dimethylpolysiloxane capped at both molecular terminals with methyldimethoxysiloxy groups; dimethylpolysiloxane capped at both molecular terminals with triethoxysiloxy groups; dimethylpolysiloxane capped at both molecular terminals with trimethoxysilylethyl groups, or combinations of two or more of the above.

When the composition is cross-linked by means of hydrosilylation reaction, component (A) should be comprised of an organopolysiloxane having in one molecule on average 0.1 or greater number of silicon-bonded alkenyl groups; preferably this should be an organopolysiloxane having in one molecule on average 0.5 or greater number of silicon-bonded alkenyl groups, and even more preferably this should be an organopolysiloxane having in one molecule on average 0.8 or greater number of silicon-bonded alkenyl groups. If the average number of silicon-bonded alkenyl groups is below the lower limit of the recommended range, the obtained composition will not be sufficiently cross-linked. The silicon-bonded alkenyl groups of the aforementioned organopolysiloxane may be the same as the earlier exemplified alkenyl groups, of which the most preferable are vinyl groups. Furthermore, the silicon-bonded groups other than alkenyl groups of the aforementioned organopolysiloxane may be the same as earlier exemplified linear-chained alkyl groups, branch-chained alkyl groups, cyclic alkyl groups, aryl groups, aralkyl groups, or halogenated alkyl groups, of which most preferable are alkyl groups and aryl groups, and especially methyl groups and phenyl groups. There are no special restrictions with regard to viscosity of the last-mentioned organopolysiloxane at 25° C., and it may have viscosity within the range of 20 to 100,000 mPa·s, preferably within the range of 50 to 100,000 mPa·s, even more preferably within the range of 50 to 50,000 mPa·s, and especially within the range of 100 to 50,000 mPa·s. If the aforementioned viscosity at 25° C. is below the lower limit of the recommended range, then the cured body of the composition will have low physical properties; if it exceeds the upper limit of the recommended range, the obtained composition will be difficult to handle. There are no special restrictions with regard to the molecular structure of the aforementioned organopolysiloxane that may have the same structures as have been mentioned above, preferably a linear and a partially branched linear structure. For example, this may be a polymer having the aforementioned molecular structures, copolymer having the aforementioned molecular structures, or mixture of the above polymer and/or copolymer. Such organopolysiloxanes may be exemplified by those mentioned above that contain alkenyl groups.

When the composition is cross-linked by a condensation reaction, the organopolysiloxane should contain in one molecule at least two silanol groups or silicon-bonded hydrolyzable groups. The following are examples of the silicon-bonded hydrolyzable groups contained in the aforementioned organopolysiloxane: methoxy, ethoxy, propoxy, or similar alkoxy groups; vinyloxy, propenoxy, isopropenoxy, 1-ethyl-2-methylvinyloxy, or similar alkenoxy groups; methoxyethoxy, ethoxyethoxy, methoxypropoxy, or similar alkoxyalkoxy groups; acetoxy, octanoyloxy, or similar acyloxy groups; dimethylketoxime, methylethylketoxime, or similar ketoxime groups; dimethylamino, diethylamino, butylamino, or similar amino groups; dimethylaminoxy, diethylaminoxy, or similar aminoxy groups; and N-methylacetoamide, N-ethylacetoamide, or similar amide groups. The silicon-bonded groups other than the aforementioned silanol and silicon-bonded hydrolyzable groups contained in the organopolysiloxane may be the same linear-chained alkyl groups, branch-chained alkyl groups, cyclic alkyl groups, alkenyl groups, aryl groups, aralkyl groups, and halogenated groups as those mentioned earlier. There are no special restrictions with regard to the viscosity of these organopolysiloxanes at 25° C., and it may have viscosity within the range of 20 to 100,000 mPa·s, preferably within the range of 50 to 100,000 mPa·s, and especially within the range of 100 to 100,000 mPa·s. If the aforementioned viscosity at 25° C. is below the lower limit of the recommended range, then the cured body of the composition will have low physical properties; if it exceeds the upper limit of the recommended range, the obtained composition will be difficult to handle. There are no special restrictions with regard to the molecular structure of the aforementioned organopolysiloxane that may have the same structures as have been mentioned above, preferably a linear and a partially branched linear structure. Such an organopolysiloxane can be exemplified by the one that contains in one molecular at least two silanol groups or silicon-bonded hydrolyzable groups.

There are no special restrictions with regard to organopolysiloxane of component (A) when the composition is cross-linked by a free-radical reaction with the use of an organic peroxide, but, preferably, this should be an organopolysiloxane having in one molecule at least one silicon-bonded alkenyl group. The aforementioned silicon-bonded group contained in the organopolysiloxane may be the same linear-chained alkyl group, branch-chained alkyl group, cyclic alkyl group, alkenyl group, allyl group, aralkyl group, or halogenated alkyl group as mentioned above, of which the most preferable are alkyl group, alkenyl group, and allyl group, and especially methyl, vinyl, and phenyl groups. Furthermore, there are no special restrictions with regard to the viscosity of the aforementioned organopolysiloxane at 25° C., and it may have a viscosity within the range of 20 to 100,000 mPa·s, preferably within the range of 50 to 100,000 mPa·s, even more preferably within the range of 50 to 50,000 mPa·s, and especially within the range of 100 to 50,000 mPa·s. If the aforementioned viscosity at 25° C. is below the lower limit of the recommended range, then the cured body of the composition will have low physical properties; if it exceeds the upper limit of the recommended range, the obtained composition will be difficult to handle. Also, there are no special restrictions with regard to the molecular structure of the aforementioned organopolysiloxane, and it may have the same structure as described above, of which most preferable is a linear or a partially branched linear molecular structure. For example, this may be a polymer having the aforementioned molecular structures, copolymer having the aforementioned molecular structures, or mixture of the above polymer and/or copolymer. These organopolysiloxanes may be exemplified by the same specific examples of organopolysiloxanes that have been given above.

A thermally conductive filler that constitutes component (B) is used for imparting conductivity to the composition of the invention. This may be, e.g., an aluminum powder, copper powder, nickel powder, or another metal powder; an alumina powder, magnesium oxide powder, beryllium oxide powder, chromium oxide powder, titanium oxide powder, or a similar metal oxide powder; boron nitride powder, aluminum nitride powder, or similar nitride powder; boron carbide powder, titanium carbide powder, silicon carbide powder, or similar metal carbide powder; metal oxide powder used for imparting conductivity to surfaces by coating them with a metal-containing substance; or mixtures of two or more of the above. Particles of component (B) may have spherical, round, needle-like, disk-like, rod-like, or irregular shape. When it is required that the composition or a cross-linked body of the composition possess electrical, insulating properties, it is preferable to use metal oxide-type powder, metal nitride-type powder, or a metal carbonate-type powder, especially alumina powder. There are no special restrictions with regard to an average particle size of component (B), but it is recommended to have the average size of the particles within the range of 0.1 to 100 μm, and preferably 0.1 to 50 μm. When alumina powder is used as component (B), it is recommended that component (B) is a mixture of $(B_1)$ a spherical or round shaped alumina powder having an average particle size within the range of 5 to 50 μm (excluding 5 μm) and $(B_2)$ a spherical or irregularly shaped alumina powder having an average particle size within the range of 0.1 to 5 μm. Moreover, it is recommended that in the mixture of constitutes $(B_1)$ and $(B_2)$, the former constitutes 30 to 90% by weight, and the latter constitutes 10 to 70% by weight.

There are no special restrictions with regard to the amount in which component (B) should be used in the composition of the invention, but from the point of good electrical conductivity, it is recommended that the content of this component in the composition of the invention exceeds at least 30% by volume, preferably within the range of 30 to 90% by volume, and, in particular, between 80 and 90% by volume. In terms of % by weight, it is recommended to use this component at least in the amount of 50% by weight, preferably 70 to 98% by weight, and even more preferably, 90 to 97% by weight. More specifically, component (B) should be used in the amount of 500 to 2500 parts by weight per 100 parts by weight of component (A), preferably 500 to 2000 parts by weight, and, even more preferably, 800 to 2000 parts by weight. If the content of component (B) is below the lower limit of the recommended range, the obtained composition will have insufficient thermal and electrical conductivities. If, on the other hand, component (B) is contained in the amount exceeding the upper limit of the recommended range, either the obtained composition will have high viscosity or will not be uniform and will be difficult to handle.

The organopolysiloxane of component (C) is used for obtaining a silicone composition of high thermal conductivity. It will improve handling conditions of the composition and will impart thixotropic properties to the composition, even if component (B) is used in a large amount. Component (C) is expressed by the following general formula:

where $R^1$ represents an aliphatic, unsaturated univalent hydrocarbon group, which may be the same as those exemplified earlier; $R^2$ represents identical or different univalent hydrocarbon groups that do not have aliphatic unsaturated bonds, these groups may be the same as those exemplified earlier; $R^3$ represents an oxygen atom or a bivalent hydrocarbon group, which also can be the same as those mentioned above; $R^4$ represents a univalent hydrocarbon group that contains an acryloxy or methacryloxy group, which also may be the same as those exemplified above; $R^5$ may represent an alkyl group, alkoxyalkyl group, alkenyl group, or an acyl group, which may be the same as exemplified earlier; "n" is an integer from 5 to 1000, and "a" is 1 or 2.

The last-mentioned organopolysiloxane of component (C) may be exemplified by the same organopolysiloxanes as mentioned above. This component may comprise a mixture of organopolysiloxanes that may have different values of "a" in the above formula and the same values of "n", or this may be mixtures of organopolysiloxanes having the same values of "a" but different values of "n". When component (C) is represented by a mixture of organopolysiloxanes having the same values of "a" and different values of "n", the difference between "n's" may be greater than 5, and preferably greater than 10, and especially greater than 20. There are no special restrictions regarding proportions in which the components of the mixture should be used in the aforementioned mixtures of organopolysiloxanes having different values of "a" with constant values of "n" or with constant values of "a" and different values of "n".

Also, there are no restrictions with regard to the amount in which component (C) can be used in the composition. Component (C) can be used for treating the surface of component (B) and can be added in an amount that improves dispersion of component (B) in the composition. More specifically, it should be used in the amount of 0.1 to 10 parts by weight per 100 parts by weight of component (B), preferably in the amount of 0.1 to 5 parts by weight per 100 parts by weight of component (B). If component (C) is used in an amount smaller than the lower limit of the recommended range, the composition will have low formability when component (B) is used in large amounts. Moreover, under such conditions, component (B) will more readily precipitate during storage of the composition. On the other hand, if the content of component (C) exceeds the upper limit of the recommended range, this will impair physical properties of the composition.

There are no special restrictions with regard to the method for preparation of the composition of the invention. For example, the composition can be prepared by mixing components (B) and (C), and after pretreating the surface of the component (B) with component (C), the pretreated component can be combined with component (A); another method consists of premixing components (A) and (B), and then adding component (C) while treating the surface of component (B) with component (C) in component (A). The second method is more preferable. In the aforementioned composition, component (C) may be contained in the form applied onto the surface of component (B) or may be present independently. In treating component (B) with component (C), the treatment operation can be accelerated either by heating or by introducing acetic acid, phosphoric acid, or a similar acidic substance, or trialkylamine, quaternary ammonium salt, gaseous ammonia, ammonium carbonate, or a similar basic substance.

The composition of the invention may be further combined with (D) a cross-linking agent that imparts to the composition cross-linking properties, whereby the composition can be cross-linked for turning it into a viscous substance or into a solid body. When a hydrosilylation reaction is to be carried out, component (D) should be composed of a platinum catalyst and an organopolysiloxane that has on average 2 or more silicon-bonded hydrogen atoms in one molecule. The groups bonded to silicon in the aforementioned organopolysiloxane of component (D) may be the same linear-chained alkyl, branch-chained alkyl, cyclic-alkyl, aryl, aralkyl, and halogenated alkyl groups as those exemplified earlier. Of these, most preferable are alkyl groups and aryl groups, especially methyl and phenyl groups. There are no special restrictions with regard to viscosity of the organopolysiloxane of component (D) at 25° C., and it may have viscosity within the range of 1 to 100,000 mPa·s, preferably within the range of 1 to 5,000 mPa·s. Also, there are no special restrictions with regard to the molecular structure of the organopolysiloxane of component (D) that may have the same structures as have been mentioned above, preferably a linear and a partially branched linear structure. For example, this may have a linear-chained, branch-chained, partially branched linear-chained, cyclic, or a dendrimer molecular structure. The organopolysiloxane of component (D) may be a polymer having the aforementioned molecular structures, copolymer having the aforementioned molecular structures, or mixture of the above polymer and/or copolymer.

The following are specific examples of the organopolysiloxane of component (D): dimethylpolysiloxane capped at both molecular terminals with dimethylhydrogensiloxy groups; copolymer of methylhydrogensiloxane and dimethylsiloxane capped at both molecular terminals with trimethylsiloxy groups; copolymer of methylhydrogensiloxane and dimethylsiloxane capped at both molecular terminals with dimethylhydrogensiloxy groups; organosiloxane copolymer composed of siloxane units of the following formulas: $(CH_3)_3SiO_{1/2}$, $(CH_3)_2HSiO_{1/2}$, and $SiO_{4/2}$, or mixture of two or more of the aforementioned organopolysiloxanes.

In the composition of the invention, the organopolysiloxane of component (D) should be used in a quantity sufficient for cross-linking of the composition. In particular, it should be used in such a quantity that the number of silicon-bonded hydrogen atoms of this component is within the range of 0.1 to 10 moles, preferable 0.1 to 5 moles, and even more preferably 0.1 to 3.0 moles, per 1 mole of the aliphatic unsaturated univalent hydrocarbon groups contained in components (A) and (C). If this organopolysiloxane is used in an amount less than the lower limit of the recommended range, it would be difficult to ensure sufficient cross-linking. If, on the other hand, it is used in an amount exceeding the upper limit of the recommended range, a cross-linked product will become too hard and may develop cracks on its surface.

A platinum-type catalyst is used for accelerating curing of the composition. This may be a chloroplatinic acid, alcohol-modified chloroplatinic acid, platinum-olefin complex, platinum-alkenylsiloxane complex, or a platinum-carbonyl complex.

The platinum-type catalyst is added in an amount sufficient for accelerating cross-linking. In particular, it is recommended to add the platinum-type catalyst in such an amount that in terms of weight units the content of metallic platinum is within the range of 0.01 to 1000 ppm, preferably 0.1 to 500 ppm per weight of component (A). If it is added in an amount of less than the lower limit of the recommended range, it would be difficult to ensure sufficient cross-linking. Addition of the platinum-type catalyst in amounts exceeding the upper limit of the recommended range will not produce a noticeable effect on acceleration of the cross-linking reaction.

When the composition is cross-linked by a condensation reaction, component (D) should be composed of a silane that contains at least three silicon-bonded hydrolyzable groups in one molecule, or a product of partial hydrolyzation of the aforementioned silane, and/or a condensation-reaction catalyst. The silicon-bonded hydrolyzable groups of the aforementioned silane may be represented by alkoxy groups, alkoxyalkoxy groups, acryloxy groups, ketoxime groups, alkenoxy groups, amino groups, aminoxy groups, or amide groups. In addition to the aforementioned hydrolyzable groups, silicon atoms of the silane may be bonded to the same linear-chained alkyl groups, branch-chained alkyl groups, cyclic alkyl groups, alkenyl groups, aryl groups, aralkyl groups, and halogenated alkyl groups, as have been mentioned earlier. The silanes or product of partial hydrolyzation thereof can be exemplified by methyltriethoxysilane, vinyltriethoxysilane, vinyltriacetoxysilane, and ethylorthosilicate.

In the composition of the invention, the aforementioned silane or product of its partial hydrolyzation should be used in an amount sufficient to cause cross-linking. In particular, it should be used in an amount of 0.01 to 20 parts by weight, preferably 0.1 to 10 parts by weight per 100 parts by weight of component (A). If the silane or the product of its partial hydrolyzation is used in an amount below the lower limit of the recommended range, this will either worsen storage stability of the obtained composition or impair adhesive properties of the composition. If, on the other hand, the added amount exceeds the upper limit of the recommended range, this will noticeably delay cross-linking of the obtained composition.

It is not an indispensable requirement that the condensation-reaction catalyst should contain component (D) in the form of a silane with an aminoxy group, amino group, ketoxime group, or a similar hydrolysable group. Such a catalyst may also be represented, e.g., by tetrabutyl titanate, tetraisopropyl titanate, or a similar organic titanium acid ester; diisopropoxy bis(acetylacetate) titanium, diisopropoxy bis(ethylacetoacetate) titanium, or a similar titanium chelate compound; aluminum tris(acetylacetonate), aluminum tris (ethylacetonate), or a similar organic aluminum compound; zirconium tetra(acetylacetonate), zirconium tetrabutyrate, or a similar organic zirconium compound; dibutyltindioctoate, dibutyltindilaurate, butyltin-2-ethylhexoate, or a similar organic tin compound; tin naphthanate, tin oleate, tin butyrate, cobalt naphthenate, zinc stearate, or a similar metal salt of organic carboxylic acid; hexyl amine, dodecylamine phosphate, or a similar amine compound, or salts of the aforementioned compounds; benzyltriethylammonium acetate, or similar tertiary ammonium salts; potassium acetate, lithium nitrate, or similar lower fatty acid salts of alkali metals; dimethylhydroxylamine, diethylhydroxylamine, or similar dialkylhydroxylamine; and guanidyl-containing organic silicon compounds.

It is recommended that the condensation-reaction catalyst be contained in the composition of the invention in an amount sufficient for accelerating cross-linking. More specifically, it can be added in an amount of 0.01 to 20 parts by weight, preferably 0.1 to 10 parts by weight per 100 parts by weight of component (A). When the use of this catalyst is indispensable, addition thereof in an amount below the lower limit of the recommended range may lead to insufficient cross-linking of the obtained composition. If, on the other hand, the catalyst is used in an amount exceeding the upper limit of the recommended range, this will impair storage stability of the composition.

When the composition is cross-linked by a free-radical reaction with the use of an organic peroxide, component (D) may be comprised of an organic peroxide. Examples of such an organic peroxide are the following: benzoyl peroxide, dicumyl peroxide, 2,5-dimethyl bis(2,5-tert-butylperoxy) hexane, di-tert-butylperoxide, and tert-butylperbenzoate. In the composition of the invention, the aforementioned organic peroxide should be used in an amount sufficient to cause cross-linking. In particular, it should be used in an amount of 0.1 to 5 parts by weight per 100 parts by weight of component (A).

The other silicone composition of the invention is characterized by being composed at least of aforementioned components (B) and (C). This composition may be in the form of a non-cross-linkable grease, or may be combined with aforementioned component (D) or (E) photosensitizer and cross-linked into a viscous or solid substance. There are no special restrictions with regard to the cross-linking operation, but if the composition contains component (D), it is recommended to perform cross-linking by means of hydrosilylation reaction, condensation reaction, or free-radical reaction based on the use of an organic peroxide, and if the composition contains component (E), it is recommended to perform cross-linking by irradiation with high-energy beams such as ultraviolet rays, X-rays, electron-beam rays, or the like.

Components (B) and (C) used in the last-mentioned composition are the same as described earlier. There are no special restriction with regard to the amount in which component (B) has to be added to the composition, but from the point of view of improved thermal conductivity, it is recommended to add this component in an amount of no less than 30% by volume of the composition, i.e., 30 to 90% by volume, preferably 60 to 90% by volume, and even more preferably, 80 to 90% by volume of the composition. In terms of % by weight units, component (B) should be added in an amount of no less than 50% by weight, i.e., 70 to 98% by weight, and preferably 90 to 97% by weight of the composition. More specifically, 500 to 2500 parts by weight, preferably 500 to 2000 parts by weight, and even more preferably 800 to 2000 parts by weight of component (B) should be used for each 100 parts by weight of component (C). If component (B) is added in an amount less than the lower limit of the recommended range, the obtained composition will have insufficient thermal and electrical conductivities. If, on the other hand, component (B) is used in an amount exceeding the upper limit of the recommended range, the composition will become either extremely viscous or non-uniform in its structure, and, therefore, difficult to handle in the process.

There are no special restrictions with regard to the methods of preparation of the silicone composition. For example, according to one method, components (B) and (C) can be premixed, the surface of component (B) can be pretreated with component (C), and then component (C) can be again added to the mixture. According to another method, the surface of component (B) in component (C) can be pretreated with component (C), while mixing components (C) and (B). In this composition, only a portion of component (C) is used for treating the surface of component (B). When treating component (B) with component (C), the process can be accelerated by heating, or by adding an acetic acid, phosphoric acid, or another acidic substance, or trialkylamine, quaternary ammonium salt, gaseous ammonia, ammonium carbonate, or a similar basic substance.

The above silicone composition can be further combined with (D) cross-linking agent and cross-linked into a viscous or solid substance. When cross-linking is carried out by hydrosilylation, component (D) may consist of a platinum catalyst and organopolysiloxane having in one molecule on average two or more silicon-bonded hydrogen atoms. The organopolysiloxane may be the same as mentioned above and may be contained in an amount sufficient for cross-linking of the composition. More specifically, 0.1 to 10 moles, preferably 0.1 to 5 moles, and even more preferably 0.1 to 3.0 moles of silicon-bonded hydrogen atoms should correspond to 1 mole of aliphatic unsaturated univalent hydrocarbon groups of component (C). If this component is used in an amount below the lower limit of the recommended range, the obtained composition will be insufficiently cured, and, if, on the other hand, the added amount exceeds the upper limit of the recommended range, the cross-linked substance will become too hard, and its surface will be subject to development of cracks. A platinum-type catalyst is used for accelerating cross-linking and may be of the same as described earlier. The platinum catalyst should be used in an amount sufficient for accelerating the cross-linking process. For example, in terms of weight units, this catalyst should be used in an amount of 0.01 to 1000 ppm, preferably 0.1 to 500 ppm per weight of component (C). If it is used in an amount of less than the lower limit of the recommended range, the obtained composition will not be cured to a sufficient degree, and, if, on the other hand, it is sued in an amount exceeding the upper limit of the recommended range, this will not noticeably accelerate cross-linking of the obtained composition.

When cross-linking of the composition is performed by means of a condensation reaction, component (D) may be comprised of a silane or a product of it partial hydrolyzation that contains in one molecule at least three silicon-bonded hydrolyzable groups and/or a condensation-reaction catalyst. The silane may be the same as exemplified earlier. The silane or a product of its partial hydrolyzation should be used in an amount sufficient for cross-linking. More specifically, the added amount may be 0.01 to 20 parts by weight, preferably 0.1 to 10 parts by weight per 100 parts by weight of component (C). If the silane or a product of its partial hydrolyzation is used in an amount of less than the lower limit of the recommended range, this will make the obtained composition unstable in storage and will impair its adhesive properties. If, on the other hand, the added amount exceeds the upper limit of the recommended range, this will noticeably delay the cross-linking reaction. A condensation reaction catalyst may be the same as mentioned above and should be added in an amount sufficient for accelerating cross-linking of the composition. More specifically, it should be added in an amount of 0.01 to 20 parts by weight, preferably 0.1 to 10 parts by weight per 100 parts by weight of component (C). When the use of the last-mentioned catalyst is indispensable and it is added in an amount below the lower limit of the recommended range, it would be difficult to provide complete cross-linking, and if the catalyst is added in an amount exceeding the upper limit of the recommended range, the obtained composition will be less stable in storage.

When cross-linking of the composition is performed by means of a free-radical reaction with the use of an organic peroxide, component (D) may be comprised of the organic peroxide. The organic peroxide may be the same as mentioned earlier and should be used in an amount sufficient for cross-linking of the composition. In particular, it should be added in an amount of 0.1 to 5 parts by weight per 100 parts by weight of component (C).

The composition where (E) photosensitizer is used instead of component (D) can be cross-linked by radiating it with high-energy beams such as ultraviolet beams, X-ray beams, electron beams, or the like. Component (E) can be exemplified by benzophenone, acetophenone, benzyl, α-hydroxyketone, α-aminoketone, bisacylphosphine oxide, or derivatives of the aforementioned compounds. Such photosensitizers can be used in combinations of two or more.

Component (E) should be used in an amount sufficient for accelerating cross-linking of the composition. More specifically, it should be added in an amount of 0.01 to 20 parts by weight, preferably 0.1 to 10 parts by weight of the composition. If it is added in an amount below the lower limit of the recommended range, this will impair cross-linking properties of the obtained composition, and if, on the other hand, it is added in an amount exceeding the upper limit of the recommended range, this will negatively affect physical properties of the cross-linked product.

Within the limits not contradictory to the object of the invention, the composition may be combined with other arbitrary components, such as fumed silica, precipitated silica, fumed titanium oxide, or other fillers, as well as fillers-hydrophobized by treating their surfaces with organic silicon compounds; pigments, dyes, fluorescent dyes, heat-resistant additives, triazol-type compounds or other flame retardants, plasticizers, and adhesion-imparting agents.

When the composition is cross-linked by means of hydrosilylation, the speed of cross-linking and handleability of the composition can be improved by adding 2-methyl-3-butyn-2-ol, 2-phenyl-3-butyn-2-ol, 1-ethynyl-1-cyclohexanol, or a similar acetylene-type compound; 3-methyl-3-penten-1-yne, 3,5-dimethyl-3-hexen-1-yne, or a similar en-yne compound; as well as a hydrazine-type compound, phosphine-type compound, mercaptane-type compound, or a similar reaction inhibitor. There are no special limitations with regard to the amounts in which these additives can be used, but in general they should be added in an amount of 0.0001 to 1.0% by weight per weight of the composition.

There are no special restrictions with regard to a method that can be used for cross-linking of the composition when the latter possesses cross-linking properties. For example, after forming, the composition can be cross-linked by retaining it at room temperature or by heating it at between 50 and 200° C. Also, there are no restrictions with regard to the form of a cross-linked product that can be made in the form of highly viscous grease, solid body, gel, low-hardness rubber, or high-hardness rubber. For convenience of handling, it is preferable to obtain a solid body with type-A durometer hardness within the range of 10 to 98 according to JIS K 6253.

EXAMPLES

The organopolysiloxane and silicone composition of the present invention will be further described in more detail with reference to practical and comparative examples, where all properties are given in values measured at 25° C.

Reference Example 1

A four-neck flask equipped with a stirrer, reflux condenser, dripping funnel, and thermometer was loaded with the following components: 30 g (13.35 mmol) of dimethylpolysiloxane, capped at one molecular terminal with a dimethylvinylsiloxy group and at another molecular terminal with a silanol group, represented by the following formula:

3.67 g (14.80 mmol) of γ-methacryloxypropyl trimethoxysilane; 0.09 g (1.22 mmol) of calcium hydroxide; and 0.008 g (0.0366 mmol) of 6-di-tert-butyl-4-methyl-phenol. While being stirred, the mixture was heated to 100° C., and a reaction was then carried out for 8 hours. Upon completion of the reaction, the product was slowly cooled to room temperature, and non-dissolved calcium hydroxide was removed by filtering. The by-product methanol that was formed in the reaction was removed by distillation in vacuum at room temperature. The product was again heated to between 100° C. and 105° C., and the excess of γ-methacryloxypropyl trimethoxysilane was removed by distillation in vacuum during 3 hours. As a result, 30.08 g of a colorless reaction product was obtained. As follows from the below-given results of an NMR analysis, the reaction product was comprised of dimethylpolysiloxane (I) of the following formula:

The number-average molecular weight of the obtained dimethylpolysiloxane (I) measured by gel-permeation chromatography (with reference to polystyrene) was 4060.00. Degree of molecular weight distribution was 1.15.

The δ value (ppm) of $^{13}$C-NMR (100 MHz, CDCl$_3$): −2.1, −0.14, 0.26, 0.41, 0.64, 0.73, 1.0, 6.6, 17.9, 21.9, 49.7, 66.1, 124.4, 130.9, 135.9, 138.6, 166.5.

The δ value (ppm) of $^{29}$Si—NMR (80 MHz, CDCl$_3$): −50.7, −22.4 to −20.8 [m, (CH$_3$)$_2$SiO], −4.1.

Reference Example 2

A four-neck flask equipped with a stirrer, reflux condenser, dripping funnel, and thermometer was loaded with the following components: 30 g (13.35 mmol) of dimethylpolysiloxane, capped at one molecular terminal with a silanol group, represented by the following formula:

3.28 g (14.00 mmol) of γ-acryloxypropyl trimethoxysilane; 0.09 g (1.22 mmol) of calcium hydroxide; and 0.008 g (0.0366 mmol) of 6-di-tert-butyl-4-methyl-phenol. While being stirred, the mixture was heated to 80° C., and a reaction was then carried out for 8 hours. Upon completion of the reaction, the product was slowly cooled to room temperature, and a non-dissolved calcium hydroxide was removed by filtering. The by-product methanol that was formed in the reaction was removed by distillation in vacuum at room temperature. The product was again heated to 80° C., and the excess of γ-acryloxypropyl trimethoxysilane was removed by distillation in vacuum during 3 hours. As a result, 30.15 g of a colorless reaction product was obtained. As follows from the below-given results of an NMR analysis, the reaction product was comprised of dimethylpolysiloxane (II) of the following formula:

The number-average molecular weight of the obtained dimethylpolysiloxane (I) measured by gel-permeation chromatography (with reference to polystyrene) was 4143.37. Degree of molecular weight distribution was 1.16.

The δ value (ppm) of $^{13}$C-NMR (100 MHz, CDCl$_3$): −2.0, −0.19, 0.09, 0.50, 0.65, 0.88, 0.98, 1.2, 6.8, 22.1, 49.9, 66.2, 128.3, 129.9, 131.2, 138.9, 165.6.

The δ value (ppm) of $^{29}$Si—NMR (80 MHz, CDCl$_3$): −50.7, −22.3 to −20.7 [m, (CH$_3$)$_2$SiO], −4.1.

Practical Example 1

A thermally conductive silicone rubber base was prepared by mixing the following components in a mixer: 2.133 parts by weight of dimethylpolysiloxane capped at both molecular terminals with dimethylvinylsiloxy groups (content of vinyl groups: 0.44% by weight; viscosity: 400 mPa·s); 22.5 parts by weight of alumina powder having round configuration of particle with an average particle size of 11 μm; and 0.25 parts by weight of organopolysiloxane (I) prepared in Reference Example 1.

The obtained rubber base was mixed with 0.089 parts by weight of a dimethylsiloxane-methylhydrogensiloxane copolymer having both molecular terminals capped with trimethylsiloxy groups and containing in one molecule on average 5 silicon-bonded hydrogen atoms (content of silicon-bonded hydrogen atoms: 0.76% by weight; viscosity: 5 mPa·s; 1.48 mole of silicon-bonded hydrogen atoms per 1 mole of vinyl groups in the aforementioned rubber base), and 0.024 parts by weight of a reaction inhibitor in the form of 1-ethynyl-1-cyclohexanol. The mixture was then combined with 0.014 parts by weight of a platinum-1,3-divinyl-1,1,3,3-tetramethyldisiloxane complex that contained 0.5% by weight of metallic platinum. As a result, a thermally conductive silicone rubber composition was obtained.

Characteristics of the silicone rubber composition and silicone rubber obtained by cross-linking the composition were measured. The results of measurements are shown in Table 1.

[Viscosity of Silicone Rubber Composition]

Viscosity of the silicone rubber composition was measured by means of a rheometer (AR500) of TA Instruments Co. Geometry was a 20 mm diameter and 2° cone/plate. Viscosity was measured at different rotational speeds of 0.3 rpm and 3.0 rpm. After measuring viscosity at 0.3 rpm, the composition was left intact for 5 min. and then measurement was continued at 3.0 rpm. In both cases, viscosity values were taken after 10 min. A moderately big ratio of viscosity obtained at low speed to viscosity obtained at high speed testifies to the fact that the silicone rubber composition possesses not only good handleability but also thixotropy. Moreover, the composition resists precipitation of alumina, and is characterized by high storage stability.

[Formability of the Silicone Rubber Composition]

The silicone rubber composition was squeezed between 0.2 mm-thick polytetrafluoroethylene films so that the thickness of the sandwiched layer becomes 1 mm, and then the composition was heated for 15 min. at 150° C. and thus cross-linked. The polytetrafluoroethylene films were peeled off, and the obtained silicone rubber sheet was visually inspected. Formability was evaluated by using the following criteria:

○—good moldability with the formation of a uniform silicone rubber sheet;

Δ—the composition can be formed into a sheet with satisfactory moldability and local weakening;

X—even though the composition can be formed into a sheet, moldability is poor and the molded body is weak.

[Adhesive Strength of Silicone Rubber]

The silicone composition was sandwiched between adherents (aluminum plates of Paltek Co., Ltd.; JIS H 4000, A1050P) and cross-linked by heating for 30 min. at 150° C. A 1 mm-thick adhesive layer was then formed on a 25 mm×10 mm adhesive area. A tensile shear adhesive strength of the obtained silicone rubber was measured in accordance with JIS K 6249.

[Coefficient of Thermal Conductivity of Silicone Rubber]

In accordance with a conventional method, the coefficient of thermal conductivity of the silicone rubber was measured by means of a resin thermal resistance tester of Hitachi Seisakusho Co., Ltd. in terms of thermal resistance determined at 50° C. on a 1 m-thick sheet having a test area of 1 cm×1 cm. The coefficient of thermal conductivity was calculated from the value of obtained thermal resistance.

Practical Example 2

A silicone rubber composition was prepared by the same method as in Practical Example 1, with the exception that dimethylpolysiloxane(II) obtained in Reference Example 2 was used instead of dimethylpolysiloxane(I) of Practical Example 1. Characteristics of the obtained silicone rubber composition and of the silicone rubber obtained by cross-linking the composition were measured. The results of measurements are shown in Table 1.

Comparative Example 1

A silicone rubber composition was prepared by the same method as in Practical Example 1, with the exception that a dimethylpolysiloxane represented by the following formula:

was used instead of dimethylpolysiloxane (I) of Practical Example 1. Characteristics of the obtained silicone rubber composition and of the silicone rubber obtained by cross-linking the composition were measured. The results of measurements are shown in Table 1.

TABLE 1

| | | Example No. | | |
|---|---|---|---|---|
| Properties | | Pr. Ex. 1 | Pr. Ex. 2 | Comp. Ex. 1 |
| Viscosity | 0.3 rpm | 461 | 471 | 174 |
| (Pa · s) | 3.0 rpm | 90 | 43 | 48 |
| Moldability | | ○ | ○ | X |
| Adhesion to Al (N/cm$^2$) | | 175.0 | 131.3 | 38.2 |
| Coefficient of thermal conductivity (W/m · K) | | 3.41 | 2.72 | 2.84 |

Practical Example 3

A silicone composition was prepared by mixing the following components in a mixer: 1.745 parts by weight of dimethylpolysiloxane obtained in Reference Example 1; 13.95 parts by weight of a spherical alumina powder having an average particle size of 40 μm; 9.3 parts by weight of irregular shaped alumina powder having an average particle size of 1.3 μm; and 0.015 parts by weight of 2-hydroxy-2-methyl-1-phenylpropan-1-one. Characteristics of the obtained silicone composition were measured by the methods described below. The results of measurements are shown in Table 2.

[Viscosity of Silicone Composition]

Viscosity of the obtained silicone composition was measured by the same method as in Practical Example 1.

[Coefficient of Thermal Conductivity of the Silicone Composition]

In accordance with a conventional method, the coefficient of thermal conductivity of the silicone composition was measured by means of a resin thermal resistance tester of Hitachi Seisakusho Co., Ltd. in terms of thermal resistance determined at 50° C. on a sheet having a thickness between 100 μm and 200 μm and a test area of 1 cm×1 cm. The coefficient of thermal conductivity was calculated from the value of obtained thermal resistance that had approximately a linear dependence from the latter. Furthermore, the coefficient of thermal conductivity was also measured in a grease state of the composition prior to cross-linking.

[Cross-Linking Properties of the Silicone Composition]

Figure 1:
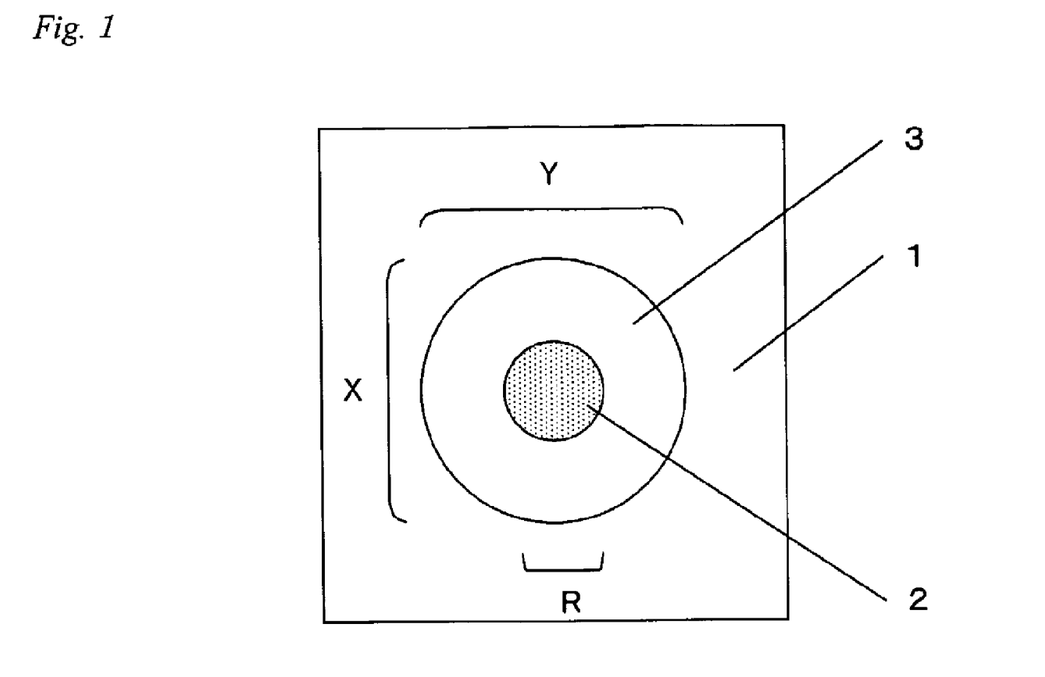
FIG. 1 is a top view on a test piece used for evaluating cross-linking properties of the silicone composition in Practical Examples 3 and 4.

Cross-linking properties of the silicone composition were evaluated by a method illustrated with reference to FIG. 1. More specifically, 0.1 ml of the silicone composition was spread over the surface of a 5 cm×5 cm ground glass plate, and then a test piece was made by placing another similar glass plate onto the first one through 1 mm-thick spacers installed on four corners of the first glass plate. Exudation of an oil component (non-cross-linked component in a cross-linked product) was observed in the specimen prior to cross-linking and after cross-linking by holding the specimen for 6 hours at 100° C. Cross-linking properties were evaluated by using the following formula:

$$X+Y-2R,$$

where
X is a width (mm) of the zone of the oil component exuded in the longitudinal direction;
Y is a width (mm) of the zone of the oil component exuded in the transverse direction;
R is a width (mm) of the silicone composition or a cross-linked silicone body. The smaller is the obtained value, the better are cross-linking properties of the silicone composition, and hence the smaller is exudation of non-cross-linked components. Ultraviolet radiation was carried out with the use of a high-pressure mercury lamp (UVL-4000-O, the product of Ushio Denko Co., Ltd.). Radiation conditions: 0.54 J/cm$^2$ radiation doze; 1 to 3 exposures; 254 nm UV rays.

Practical Example 4

A silicone composition was prepared by the same method as in Practical Example 3, with the exception that dimethylpolysiloxane(II) of Reference Example 2 was used instead of dimethylpolysiloxane(I). Characteristics of the silicone composition were measured in the same manner as in Practical Example 3. The results are shown in Table 2.

Comparative Example 2

A silicone composition was prepared by the same method as in Practical Example 3, with the exception that 6.5 parts by weight of γ-methacryloxypropyltrimethoxysilane were used instead of 1.745 parts by weight of dimethylpolysiloxane (I) and that the 2-hydroxy-2-methyl-1-phenylpropan-1-one (the product of Ciba-Geigi Co., Ltd.) was used in an amount of 0.5 parts by weight. It was impossible, however, to obtain a uniform composition.

TABLE 2

| | | Example No. | | |
|---|---|---|---|---|
| Characteristics | | Pr. Ex. 3 | Pr. Ex. 4 | Comp. Ex. 2 |
| Viscosity | 0.3 rpm | 108 | 55.97 | Not measurable |
| (Pa · s) | 3.0 rpm | 34.55 | 24.43 | |
| Exudation of oil (mm) | Prior to UV radiation | 5.1 | 4.7 | |
| | UV radiation ×1 | 4.7 | 1.6 | |
| | UV radiation ×3 | 4.5 | 1.3 | |
| Coefficient of thermal conductivity (W/m · K) | | 3.74 | 4.52 | |

Practical Example 5

A grease-like silicone composition was prepared by mixing the following components in a mixer: 0.504 parts by weight of dimethylpolysiloxane (I) obtained in Reference Example 1; 13.95 parts by weight of a spherical alumina powder having an average particle size of 40 μm; 9.3 parts by weight of irregular-shape alumina powder having an average particle size of 1.3 μm; and 1.258 parts by weight of dimethylpolysiloxane capped at both molecular terminals with dimethylvinylsiloxy groups (viscosity: 400 mPa·s; content of vinyl groups: 0.44% by weight).

Characteristics of the obtained silicone composition were measured by the methods described below. The results of measurements are shown in Table 3.

[Viscosity of the Silicone Composition]

Viscosity was measured by the same method as in Practical Example 1, with the exception that geometry of the plate was a 20 mm diameter and thickness of the silicone composition layer was 200 μm.

[Coefficient of Thermal Conductivity]

In accordance with a conventional method, the coefficient of thermal conductivity of the grease-like silicone composition was measured by means of a resin thermal resistance tester of Hitachi Seisakusho Co., Ltd. in terms of thermal resistance determined at 50° C. on a sheet having a thickness between 100 μm and 200 μm and a test area of 1 cm×1 cm. The coefficient of thermal conductivity was calculated from the value of the obtained thermal resistance that had approximately a linear dependence from the latter.

TABLE 3

| Characteristics | | Example No. Practical Example 5 |
|---|---|---|
| Viscosity (Pa · s) | 0.3 rpm | 351.3 |
|  | 3.0 rpm | 114.4 |
| Coefficient of thermal conductivity (W/m · K) | | 3.87 |

Practical Example 6

A silicone composition was prepared by mixing the following components in a mixer: 1.707 parts by weight of dimethylpolysiloxane (I) obtained in Reference Example 1; 13.95 parts by weight of spherical alumina powder having an average particle size of 40 μm; 9.3 parts by weight of irregularly shaped alumina powder having an average particle size of 1.3 μm; 0.04 parts by weight of a copolymer of dimethylsiloxane and methylhydrogensiloxane capped at both molecular terminals on average with 5 silicon-bonded hydrogen atoms in one molecule {viscosity: 5 mPa·s; content of silicon-bonded hydrogen atoms: 0.76% by weight; the content of silicon-bonded hydrogen atoms contained in this component was 0.43 moles per 1 mole of vinyl groups in aforementioned dimethylpolysiloxane (I)}; and 0.001 parts by weight of a complex of platinum and 1,3-divinyl-1,1,3,3-tetramethyldisiloxane with 0.5% by weight of metallic platinum in the complex.

Characteristics of the obtained silicone composition were measured by the methods described below. The results of measurements are shown below in Table 4.

[Viscosity of the Silicone Composition]

Viscosity of the silicone composition was measured by the same method as in Practical Example 1, with the exception that in the geometry a 20 mm diameter plate was used and that the silicone composition layer had a thickness of 200 μm.

[Cross-Linking Properties of the Silicone Composition]

Cross-linking properties of the silicone composition were evaluated by measuring viscosity after 30 min. heating at 150° C. Heating for 30 min. at 150° C. turned the composition into a viscous grease. The increase in viscosity was considered appropriate when after application of the composition, e.g., onto a substrate for a semiconductor device with subsequent heating, it was possible to prevent exudation of silicone components.

[Coefficient of Thermal Conductivity of the Silicone Composition]

In accordance with a conventional method, the coefficient of thermal conductivity of the silicone composition was measured by means of a resin thermal resistance tester of Hitachi Seisakusho Co., Ltd. in terms of thermal resistance determined at 50° C. on a sheet having a thickness between 100 μm and 200 μm and a test area of 1 cm×1 cm. The coefficient of thermal conductivity was calculated from the value of obtained thermal resistance that had approximately a linear dependence from the latter. Furthermore, the coefficient of thermal conductivity was also measured in a grease state of the composition prior to cross-linking.

Practical Example 7

A silicone composition was prepared by mixing the following components in a mixer: 1.653 parts by weight of dimethylpolysiloxane (II) obtained in Reference Example 2; 13.95 parts by weight of spherical alumina powder having an average particle size of 40 μm; 9.3 parts by weight of irregularly shaped alumina powder having an average particle size of 1.3 μm; and 0.1 parts by weight of dimethylpolysiloxane capped at both molecular terminals with trimethylsiloxy groups that contained 50% by weight of bis(p-methylbenzoyl) peroxide (viscosity: 10,000 mPa·s). Characteristics of the obtained silicone composition were measured in the same manner as in Practical Example 6. The results of measurement are shown in Table 4. The value of viscosity is absence since after 30 min. of heating at 150° C. the composition turned into a silicone rubber.

Practical Example 8

A silicone composition was prepared by mixing the following components in a mixer: 1.736 parts by weight of dimethylpolysiloxane (I) obtained in Reference Example 1; 13.95 parts by weight of spherical alumina powder having an average particle size of 40 μm; 9.3 parts by weight of irregularly shaped alumina powder having an average particle size of 1.3 μm; and 0.018 parts by weight of dibutyltindilaurate. Characteristics of the obtained silicone composition were measured in the same manner as in Practical Example 6. The results of measurement are shown in Table 4. Cross-linking properties of the obtained silicone composition were evaluated as described below.

[Cross-Linking Properties of the Silicone Composition]

Cross-linking properties of the silicone composition were evaluated by measuring viscosity after 4 day curing at 55% relative humidity and a 25° C. temperature. Curing during 4 days at 55% relative humidity and a 25° C. temperature turned the composition into a viscous grease. The increase in viscosity was considered appropriate when after application of the composition, e.g., onto a substrate for a semiconductor device with subsequent heating, it was possible to prevent exudation of silicone components.

TABLE 4

| Characteristics | | Example No. | | |
|---|---|---|---|---|
| | | Pr. Ex. 6 | Pr. Ex. 7 | Pr. Ex. 8 |
| Viscosity (Pa · s) | 0.3 rpm | 197.3 | 79.33 | 77.52 |
|  | 3.0 rpm | 92.65 | 33.86 | 27.99 |
| Viscosity | 0.3 rpm | 437 | Measurement | — |

TABLE 4-continued

| | | Example No. | |
|---|---|---|---|
| Characteristics | Pr. Ex. 6 | Pr. Ex. 7 | Pr. Ex. 8 |
| after heating 3.0 rpm (Pa·s) | 158.7 | impossible | |
| Viscosity after 0.3 rpm curing (Pa·s) 3.0 rpm | — | — | 195.6 95.61 |
| Coefficient of thermal conductivity (W/m·K) | 4.21 | 4.62 | 4.01 |

INDUSTRIAL APPLICABILITY

The organopolysiloxane of the present invention, which is a novel compound that is capped at the molecular terminals with univalent unsaturated hydrocarbon groups and contains an acryloxy group or a methacryloxy group and silicon-bonded hydrolyzable groups, can be used as a surface-treating agent for inorganic powders, a surface-treating agent for thermally conductive powders, or a raw material for obtaining various copolymers copolymerized from silicone macromonomers. Furthermore, the aforementioned organopolysiloxane can be used as a main component of a composition or as a surface-treating agent for a thermally conductive filler. Therefore, in the preparation of a silicone composition of high thermal conductivity, the use of the organopolysiloxane of the invention makes it possible to add larger amounts of a thermally conductive filler, to improve handleability of the composition, and to impart to the composition an appropriate thixotropy. Since it becomes possible to control flowability, the organopolysiloxane can be applied by means of a dispenser and used as a heat-radiating agent for electrical and electronic devices.

The invention claimed is:

1. An organopolysiloxane represented by the following general formula:

where $R^1$ represents an aliphatic, unsaturated univalent hydrocarbon group, $R^2$ represents univalent hydrocarbon groups that do not have aliphatic unsaturated bonds, wherein each $R^2$ is identical to or different from each other, $R^3$ represents an oxygen atom or a bivalent hydrocarbon group, $R^4$ represents a univalent hydrocarbon group that contains an acryloxy or methacryloxy group, $R^5$ may represent an alkyl group, alkoxyalkyl group, alkenyl group, or an acyl group; "n" is an integer from 5 to 1000, and "a" is 1 or 2.

2. The organopolysiloxane of claim 1 in combination with an inorganic powder.

3. The organopolysiloxane of claim 2, wherein said inorganic powder is a thermally conductive powder.

4. A silicone composition comprising:
(A) an organopolysiloxane with the exception of component (C) given below,
(B) thermally conductive filler, and
(C) an organopolysiloxane represented by the following general formula:

where $R^1$ represents an aliphatic, unsaturated univalent hydrocarbon group, $R^2$ represents univalent hydrocarbon groups that do not have aliphatic unsaturated bonds wherein each $R^2$ is identical to or different from each other, $R^3$ represents an oxygen atom or a bivalent hydrocarbon group, $R^4$ represents a univalent hydrocarbon group that contains an acryloxy or methacryloxy group, $R^5$ may represent an alkyl group, alkoxyalkyl group, alkenyl group, or an acyl group; "n" is an integer from 5 to 1000, and "a" is 1 or 2.

5. The silicone composition of claim 4, further comprising (D) a cross-linking agent.

6. The silicone composition of claim 4, wherein an average particle size of component (B) is within the range of 0.01 to 100 μm.

7. The silicone composition of claim 4, wherein component (B) is an alumina powder.

8. The silicone composition of claim 7, wherein component (B) is a mixture of ($B_1$) a spherical or round shaped alumina powder having an average particle size within the range of 5 to 50 μm excluding 5 μm, and ($B_2$) a spherical or irregularly shaped alumina powder having average particle size within the range of 0.1 to 5 μm.

9. The silicone composition of claim 8, wherein component (B) comprises 30 to 90% by weight of component ($B_1$) and 10 to 70% by weight of component ($B_2$).

10. The silicone composition of claim 4, that comprises component (B) in an amount of 500 to 2500 parts by weight per 100 parts by weight of component (A).

11. The silicone composition of claim 4, that comprises component (C) in an amount of 0.1 to 10 parts by weight per 100 parts by weight of component (B).

12. The silicone composition of claim 4, wherein component (B) is surface-treated with component (C) in component (A).

13. A silicone composition comprising:
(B) a thermally conductive filler, and
(C) an organopolysiloxane represented by the following general formula:

where $R^1$ represents an aliphatic, unsaturated univalent hydrocarbon group, $R^2$ represents univalent hydrocarbon groups that do not have aliphatic unsaturated bonds, wherein each $R^2$ is identical to or different from each other, $R^3$ represents an oxygen atom or a bivalent hydrocarbon group, $R^4$ represents a univalent hydrocarbon group that contains an acryloxy or methacryloxy group, $R^5$ may represent an alkyl group, alkoxyalkyl group, alkenyl group, or an acyl group; and "n" is an integer from 5 to 1000, and "a" is 1 or 2.

14. The silicone composition of claim 13, further comprising (D) a cross-linking agent or (E) a photosensitization agent.

15. The silicone composition of claim 13, wherein an average particle size of component (B) is within the range of 0.01 to 100 μm.

16. The silicone composition of claim 13, wherein component (B) is an alumina powder.

17. The silicone composition of claim 16, wherein component (B) is a mixture of ($B_1$) a spherical or round shaped alumina powder having an average particle size within the range of 5 to 50 μm excluding 5 μm, and ($B_2$) a spherical or irregularly shaped alumina powder having an average particle size within the range of 0.1 to 5 μm.

18. The silicone composition of claim 17, wherein component (B) contains 30 to 90% by weight of component ($B_1$) and 10 to 70% by weight of component ($B_2$).

19. The silicone composition of claim 13, that comprises component (B) in an amount of 500 to 2500 parts by weight per 100 parts by weight of component (C).

* * * * *